Patented Oct. 2, 1934

1,975,167

UNITED STATES PATENT OFFICE 1,975,167

PREPARATION OF KETONE-AMINES

Ludwig Meuser, Naugatuck, Conn., assignor to The Naugatuck Chemical Company, Naugatuck, Conn., a corporation of Connecticut No Drawing. Application May 6, 1932, Serial No. 609,777

28 Claims. (Cl. 260—130)

The invention relates to a method of producing reaction products of ketones and amines, and has reference more particularly to the preparation of condensation products of ketones and secondary amines.

An object of the invention is to effect the condensation of said materials in a more rapid and economical way and to produce from said materials products having a high degree of purity and strength as rubber antioxidants. Further objects are to reduce corrosion in metal equipment such as iron, reduce the time of reaction, reduce the cost of catalyst for the reaction, and to increase the yield of reaction product. Other objects will be apparent from the description.

The invention comprises reacting ketones and secondary amines by heating them together in contact with a heavy metal iodide or heavy metal bromide as the reaction catalyst. Water formed during the reaction may be removed by distillation together with any excess of unreacted materials. Good results are obtained with any of the heavy metal iodides or bromides with the exception of those of lead. From the standpoint of cost and all around efficiency the best results are obtained with tin iodide and iron iodide.

For the purposes of illustrating the invention reference is made to certain examples in which the parts are by weight:

*Example 1.*—166 parts of diphenylamine, 114 parts of acetone and 1.06 parts of $FeI_2.4H_2O$ are reacted by heating in an iron autoclave from room temperature to 250° C. during 2 hours, and then for 22 hours at 250° C. which is equivalent to approximately 600 pounds gauge pressure. Thereafter the reaction product is distilled up to 150° C. liquid temperature at ordinary pressure to remove water of formation and excess acetone. 208 parts of a viscous dark brown oily residue is obtained. The same type of product results from reacting the materials for 5, 10, 15 or 20 hours at 250° C. instead of 22 hrs. at 250° C.

*Example 2.*—33.2 parts of diphenylamine, 22.8 parts of acetone and 0.2 parts of $FeBr_2$ are reacted for 20 hrs. at 250° C. in an autoclave and the reaction mixture thereafter distilled as in Example 1. 43 parts of a dark brown viscous material similar to that prepared in Example 1 is obtained.

*Example 3.*—132.8 parts of diphenylamine, 91.2 parts of acetone, 1.2 parts of $SnI_2$ are placed in an autoclave and reaction is carried on for about 20 hours at 250° C. The reaction product is treated as in Example 1, resulting in 174.5 parts of a dark brown viscous material.

The antioxidant properties of the reaction products may be substantially improved by subjecting them to a treatment with alkali and then washing free from excess alkali and any water soluble iodide or bromide salts.

*Example 4.*—The products as prepared in Examples 1, 2 and 3 are treated with 1 to 5 times their weight of aqueous ammonia (28° Bé.) with or without additional water, and the mixture heated gently to about 30-40° C. with thorough agitation for about 1-3 hrs. Thereafter the reaction product is washed free of formed ammonium halide and excess ammonia, with water, and finally dried by heating to 150° C. liquid temperature at ordinary pressure. The ammonia washed product of Example 3 when tested in rubber showed better air ageing, better oxygen bomb ageing, better heat (212° F.) ageing and equivalent flex-cracking values, both before and after ageing, and equivalent resistance to abrasion values, as compared with the ammonia washed product of Example 1. When alkali washing is omitted rubber treated with the reaction product shows relatively less resistance to flex-cracking both before and after ageing.

Instead of ammonia other water soluble alkalies may be used such as caustic soda or potash and the reaction product treated in a similar manner. Smaller or larger amounts of alkali may be used as found convenient. Finally the relative or comparative improvements noted in antioxidant value where even theoretical amounts of alkalies, such as sodium or ammonium hydroxide, are used to combine with catalyst with no washing step prior to final drying, or where no alkali is used and the catalyst and soluble materials arising therefrom are removed solely by washing with water are each considered as obvious from the invention as practiced in preferred examples and so claimed.

Examples of other amines that may be employed are phenyl-beta-naphthylamine, monomethyl aniline, mono-ethyl aniline, beta-beta di-naphthylamine, and phenyl alpha naphthylamine. Examples of other ketones that may be employed are benzophenone, mesityl oxide, acetophenone, methyl ethyl ketone, etc. Examples of other catalysts are stannic iodide, aluminum iodide, nickel iodide, cobalt iodide, copper iodide, bismuth iodide, antimony iodide, ferrous bromide, manganese iodide, zinc iodide, etc. Copper iodide appears to be the least active of this group of catalysts. It will be apparent from the chemical nature of the materials cited above that the present invention provides a new and novel method for condensing aromatic secondary amines with aliphatic, aromatic, and mixed aliphatic-aromatic ketones by means of or in the presence of heavy metal halides, lead being excepted. In addition, experience has shown, when chlorine is the halogen present in the heavy metal halide, that materials in low yield with markedly inferior antioxidant properties are produced.

It is to be understood that the invention is to be applied and employed where secondary amines are added as such, as well as where they are formed in situ. It is well known in the prior art that halogen containing materials, when present in only catalytic amounts, produce secondary amines from primary amines, e. g. diphenylamine from aniline, and it would be obvious to those skilled in the art that an aggregate process or reaction could follow in whole or in part under the conditions cited in the present invention. Furthermore, primary amines such as aniline when reacted in the presence of ketones such as acetone, sometimes depending on the proportions of chemicals and temperatures of the reaction employed, may change to a secondary amino compound which in turn reacts with more ketone to form a ketone-secondary amine reaction product.

Whereas the metallic halides cited in preferred examples are in the reduced or lower valent state, reaction products of similar antioxidant values are produced with the corresponding metallic halides in the higher valent state, when used in equivalent molecular proportions. Instead of using a single catalyst, a mixture of any of them may be used for the purposes of the invention. Whereas for purposes of illustration as to the advantages to be derived by practicing present invention, certain conditions of temperature and pressure and proportions of reactants and catalysts are cited in the preferred examples, it is to be understood that the invention is not to be limited thereby.

Having thus described my invention, what I claim and desire to protect by Letters Patent is:

1. The process which comprises bringing a non-lead heavy metal halide into contact with a ketone and a secondary aromatic amine and heating the materials to produce a ketone-amine reaction product, the halogen portion of said halide having an atomic weight of not less than approximately 79.9.

2. The process which comprises bringing a catalytic amount of non-lead heavy metal halide into contact with an aliphatic ketone and a secondary aromatic amine and heating to produce an aliphatic ketone-secondary aromatic amine reaction product, the halogen portion of said halide having an atomic weight of not less than approximately 79.9.

3. The process which comprises bringing a catalytic amount of a non-lead heavy metal halide into contact with an aromatic ketone and a secondary aromatic amine and heating to produce an aromatic ketone-secondary aromatic amine reaction product, the halogen portion of said halide having an atomic weight of not less than approximately 79.9.

4. The process which comprises bringing a catalytic amount of a non-lead heavy metal halide into contact with a ketone and an aromatic secondary amine and heating to produce a ketone-secondary amine reaction product, the halogen portion of said halide having an atomic weight of not less than approximately 79.9, and subsequently separating and washing the reaction product with alkali and water and drying.

5. The process which comprises bringing a catalytic amount of a non-lead heavy metal halide into contact with a ketone and an aromatic secondary amine and heating to produce a ketone-secondary amine reaction product, the halogen portion of said halide having an atomic weight of not less than approximately 79.9, and subsequently separating and washing the reaction product with sodium hydroxide and water and drying.

6. The process which comprises bringing a catalytic amount of a non-lead metal halide, the halogen of which has an atomic weight of not less than approximately 79.9, into contact with a ketone and a secondary aromatic amine, and heating to produce a ketone-secondary aromatic amine reaction product.

7. The process which comprises bringing a catalytic amount of iron halide the halogen of which has an atomic weight of not less than approximately 79.9 into contact with an aliphatic ketone and a diarylamine and heating the materials under pressure greater than atmospheric to form a reaction product.

8. The process which comprises bringing a catalytic amount of iron halide the halogen of which has an atomic weight of not less than approximately 79.9 into contact with an aliphatic ketone and a diarylamine and heating the materials under pressure greater than atmospheric to form a reaction product, and subsequently separating and washing the reaction product with water and drying.

9. The process which comprises bringing a catalytic amount of iron halide the halogen of which has an atomic weight of not less than approximately 79.9 into contact with an aliphatic ketone and a diarylamine and heating the materials under pressure greater than atmospheric to form a reaction product, and subsequently separating and washing the reaction product with alkali and water and drying.

10. The process which comprises bringing a catalytic amount of tin halide the halogen of which has an atomic weight of not less than approximately 79.9 into contact with an aliphatic ketone and a diarylamine and heating the materials under pressure greater than atmospheric to form a reaction product.

11. The process which comprises bringing a catalytic amount of ferrous iodide into contact with acetone and diphenylamine and heating the materials under pressure greater than atmospheric to form a reaction product, and subsequently separating and washing the reaction product with ammonia and water and drying.

12. The process which comprises bringing a catalytic amount of ferrous iodide into contact with acetone and diphenylamine and heating the materials under pressure greater than atmospheric to form a reaction product, and subsequently separating and washing the reaction product with sodium hydroxide and water and drying.

13. The process which comprises bringing a catalytic amount of tin iodide into contact with acetone and diphenylamine and heating the materials under pressure greater than atmospheric to form a reaction product, and subsequently separating and washing the reaction product with ammonia and water and drying.

14. The process which comprises bringing a catalytic amount of tin iodide into contact with acetone and diphenylamine and heating the materials under pressure greater than atmospheric to form a reaction product, and subsequently separating and washing the reaction product with sodium hydroxide and water and drying.

15. The process which comprises bringing a catalytic amount of ferrous iodide into contact with acetone and phenyl beta naphthylamine and heating the materials under pressure greater than atmospheric to form a reaction product, and subsequently separating and washing the reaction product with ammonia and water and drying.

16. The process which comprises bringing a catalytic amount of ferrous iodide into contact with acetone and phenyl beta naphthylamine and heating the materials under pressure greater than atmospheric to form a reaction product, and subsequently separating and washing the reaction product with sodium hydroxide and water and drying.

17. The process which comprises bringing a catalytic amount of ferrous iodide into contact with an aliphatic ketone and a diarylamine and heating the materials to a temperature of about 250° C. under pressure greater than atmospheric to form a ketone-amine condensation product, removing water of formation and excess ketone, and washing the reaction product with alkali and water and drying.

18. The process which comprises bringing a catalytic amount of ferrous iodide into contact with a dialkyl ketone and diphenylamine and heating the materials to a temperature of about 250° C. under pressure greater than atmospheric to form a ketone-amine condensation product, removing water of formation and excess dialkyl ketone, and washing the reaction product with alkali and water and drying.

19. The process which comprises bringing a catalytic amount of ferrous iodide into contact with acetone and diphenylamine and heating the materials to a temperature of about 250° C. under pressure greater than atmospheric to form a ketone-amine condensation product, removing water of formation and excess acetone, and washing the reaction product with alkali and water and drying.

20. The ketone-amine reaction product resulting from a process as set forth in claim 4.

21. The ketone-amine reaction product resulting from a process as set forth in claim 7.

22. The ketone-amine reaction product resulting from a process as set forth in claim 9.

23. The ketone-amine reaction product resulting from a process as set forth in claim 11.

24. The ketone-amine reaction product resulting from a process as set forth in claim 12.

25. The ketone-amine reaction product resulting from a process as set forth in claim 15.

26. The ketone-amine reaction product resulting from a process as set forth in claim 17.

27. The ketone-amine reaction product resulting from a process as set forth in claim 18.

28. The ketone-amine reaction product resulting from a process as set forth in claim 19.

LUDWIG MEUSER.